May 15, 1962 S. B. HOLMES 3,034,604
FISHING REEL
Filed June 29, 1959

INVENTOR.
STANLEY B. HOLMES
BY
Elliott & Pastoriza
ATTORNEYS

United States Patent Office 3,034,604
Patented May 15, 1962

3,034,604
FISHING REEL
Stanley B. Holmes, 1126 19th St., Santa Monica, Calif.
Filed June 29, 1959, Ser. No. 823,715
2 Claims. (Cl. 188—90)

This invention generally relates to fishing reels particularly of the sport fishing type and more particularly concerns an improved braking mechanism for embodiment in a fishing reel construction.

Although the invention will primarily be described from the standpoint of its application to controlling the rotational speed of a sport type fishing reel, it will be appreciated that the invention may equally well be applied to any type of rotating drum or reel as a means of braking same.

Various types of relatively simple type frictional mechanisms have heretofore been employed with fishing reels and are well known in the art. However, difficulties have been experienced in endeavoring to provide a relatively simple, economical structure for braking the reel and yet providing a structure which is still susceptible of convenient, precise manual control. Furthermore, any braking mechanism employed with a fishing reel must necessarily enable relatively free rotation of the reel at the time the line is cast, for example, and yet provide a tension in the line as soon as the weight on the end of the line hits the water and during such times as the line may be hooked by a fish.

It is, therefore, an object of the present invention to provide in a fishing reel an improved means for braking the reel against rotation which may be precisely controlled by a simple manual adjustment convenient to the fisherman.

Another object of the present invention is to provide in a fishing reel an improved means for braking the reel which may be embodied in conventional fishing reels with relatively minor modifications thereto on a competitive, economical basis.

Another object of the present invention is to provide an improvement in a fishing reel in the form of braking means which automatically enables the line to be regulated with a controlled degree of tension and yet which enables the line to be cast, for example, with appreciably no tension therein.

Still another object of the present invention is to provide in a fishing reel improved braking means comprising a minimum number of parts, which are substantially self lubricating such that relatively no maintenance is required over a long period of life.

These and other objects and advantages of the present invention are generally attained by providing fishing reel side plate means which define therein a chamber for receiving a fluid. Pumping means are disposed within the chamber, and the pumping means are coupled for rotation with the reel.

Fluid passage means are formed in the side plate means and communicate with the interior of the chamber between the inlet and outlet side of the pump means.

As a further feature of the present invention, fluid flow limiting means are interposed in the fluid passage means for controlling the rate of fluid flow through the passage means from one side of the pump to the other.

A better understanding of the present invention will be had by reference to the drawings merely showing illustrative embodiments in which.

Figure 1:
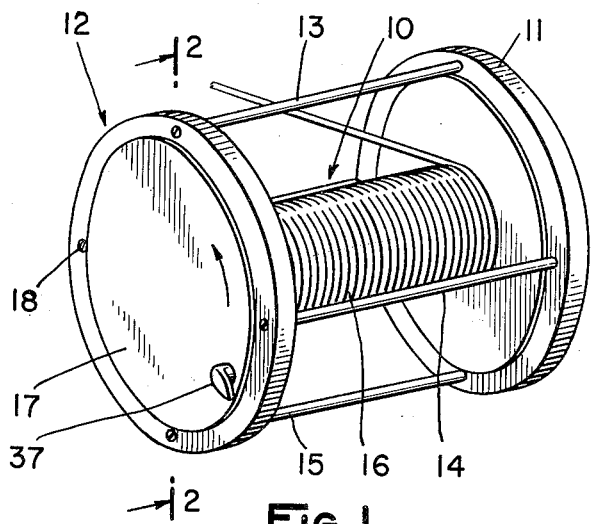
FIGURE 1 is a perspective view of a part of a fishing reel embodying the improvement of the present invention.

Referring now to the drawings, there is shown in FIGURE 1 the main body of a fishing reel 10, according to the present invention. The fishing reel 10 embodies a conventional side plate means 11 to which may be attached a handle and certain other control devices well known in the art and not shown in the drawing. On the left side of the fishing reel, as shown in FIGURE 1, there is shown a side plate means generally designated by the numeral 12 embodying the improved braking means of the present invention.

The side plate means 11 and 12 are held together by conventional cross bars 13, 14, and 15. A line 16 is shown disposed about the reel 10 and extending outwardly therefrom in a direction such that rotation of the reel in the direction of the arrow will pay out the line 16.

Figure 2:
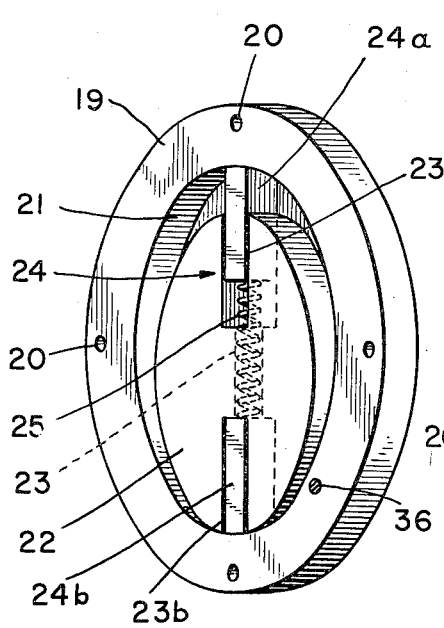
FIGURE 2 is an enlarged view of one of the side plate means of FIGURE 1 embodying the improvement according to the present invention and taken in the direction of the arrows 2—2 of FIGURE 1, the covering member being removed for clarity of illustration.

The side plate means 12 preferably comprises an outer flanged disc shaped member 17 which is sealably mounted as by screws 18, on a ridged member 19, more clearly shown in the view of FIGURE 2. For this purpose the member 19 may be provided with screw receiving apertures 20.

Referring to the view of FIGURE 2, the ridged member 19 defines therein a disc-shaped cavity or chamber 21 which is closed at its innermost end.

Figure 4:
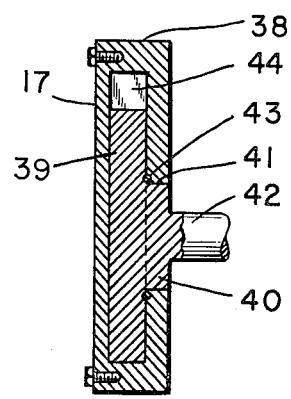

In accordance with the primary feature of the present invention, a disc pumping means 22 of lesser radius than the cavity or chamber 21 is mounted for rotation therein. The disc member 22 is sealably coupled through the innermost closed end of member 19 in a conventional manner for rotation with the reel 10 and merely replaces the conventional gear member normally embodied in present day fishing reels within the left hand side plate means. As a consequence, no effort has been made to show the means of coupling the disc member 22 for rotation with the reel 10, although necessarily a shaft or the like would extend through the closed back portion of the ridged member 19 to be coupled in a manner well known in the art with the reel 10, for example, as shown in FIGURE 4 in accordance with a modified form of the invention.

The axis of rotation of the disc member 22 is disposed below the axis of the stationary ridged member 19 such that disc member 22 will continuously define a crescent shaped opening or cavity within the chamber 21.

The disc shaped member 22 has provided therein a bore 23. In one form, the bore 23 may be embedded within the disc 22 such that an integral flat disc may be used. Bore 23 terminates at one end in a slotted portion 23a and at the other end in a slotted portion 23b. For proper functioning of the pumping means, these slotted portions 23a and 23b have been shown as extending through the entire thickness of the disc member 22. The slotted portions 23a and 23b receive radially extending vane means 24, respectively, designated as vane members 24a and 24b.

In the position of FIGURE 2, the vane member 24a is biased towards its outermost radial position by the spring means 25, while the vane member 24b has been forced inwardly against the spring tension by the side walls of the chamber 21 within the ridged member 19. It will be appreciated that as the disc member 22 is driven in either direction by the reel 10, the vane members 24a and 24b will move radially inwardly and outwardly, respectively, in view of the eccentric position of the disc 22 with respect to the circular chamber 21.

Figure 3:
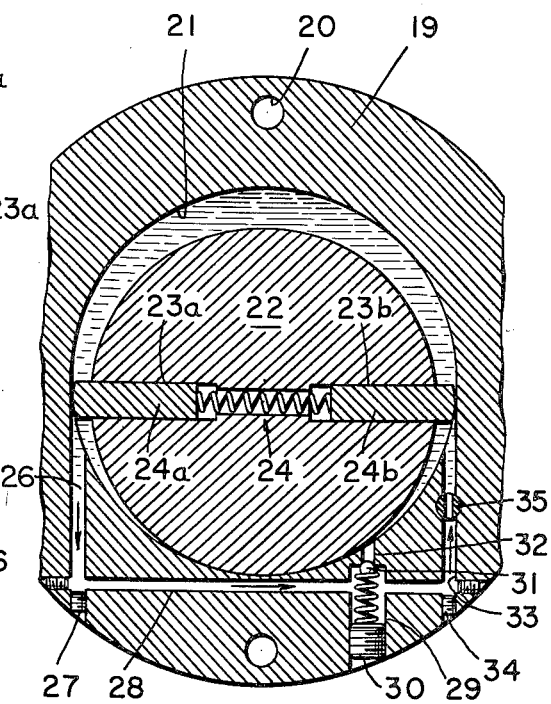
FIGURE 3 is an enlarged sectional view through that portion of the side plate means shown in FIGURE 2 illustrating the rotating parts thereof in a different operative position; and, FIGURE 4 is a sectional view through a modified form of the side plate means of FIGURE 2.

A better understanding of this operation and its embodiment or application to the braking means of the improved fishing reel of the present invention may be had by reference to FIGURE 3.

In FIGURE 3 the vane members 24a and 24b have been shown in a different operative position to merely illustrate that the disc member 22 continuously maintains its initially set position with respect to the chamber 21.

The ridged member 19 of the side plate means 12 has embodied therein a passage means 26 which extends tangentially from an opening in one side of the chamber 21. A plug means 27 may be provided to close off the lower end of the passage means 26 and to provide access thereto. A cross passage 28 communicates from the passage means 26 to a valve chamber 29 which may be plugged off at its lower end by a screw member 30, again enabling access thereto for cleaning or maintenance if required. The cross passage 28, as such, is also plugged off at both ends after it is drilled. Disposed within the valve chamber 29 is a check valve means 31 preventing upward flow through a passage 32 which communicates with the other side of the chamber 21.

The passage 28, as such communicates with another tangential passage 33 which in turn communicates with the other side of chamber 21. Again, the passage 33 may be closed off by an access plug 34.

A valve member 35 is interposed in the passage 33 and is preferably manually controlled by a shaft 36 (as shown in FIGURE 2) extending outwardly from the face of the ridged member 19. In order to effect manual movement of the shaft 36, a lever 37, as shown in FIGURE 1, is provided. Of course, other conventional manual control knobs or fingers could be employed so long as they are coupled to the valve member 35 and susceptible of regulating same.

The operation of the improved fishing reel of the present invention may now be described. Assuming that the reel 10 unwinds the line 16 in accordance with the arrow of FIGURE 1, that is, by counterclockwise rotation of the disc 22, the vane members 24a and 24b will force fluid in the direction of the arrows shown in FIGURE 3. Fluid will move through the passage 26 and thereafter into the passage 28, and thereafter upwardly through the passage 33 back into the chamber 21. Of course, in view of the disc 22 being disposed in the chamber 21, the chamber 21 actually has a crescent shaped form. In this regard, it should also be noted that outer disc member 17, as shown in FIGURE 1, is almost in juxtaposed relationship to the disc 22 and ridged member 19 such that appreciably no fluid can leak over the outer surface of the disc 22 to bypass the vane members 24a and 24b. Similarly, of course, the disc 22 must be spaced relatively close to the back wall of the ridge member 19 such that fluid cannot escape over the inner face.

As a consequence of the above construction, assuming that the valve 35 is in an open position, the reel 10 will be relatively free spooling wherein the fluid within the chamber 21 is merely driven from one side thereof to the other thereof. Of course, a certain amount of tension will be placed on the line 16 in view of the frictional engagement of the vanes 24a and 25b with the sidewalls of the chamber 21 as well as the driving force required to set the fluid in motion and to force it through the various passages. It is believed, however, that by proper design these forces may be reduced to a minimum such that their tendency to retard free spooling of the disc 22 as the line 16 is cast, for example, will not be appreciable. In this regard, it is desirable to make all passages of a cross-section equal to the maximum cross-section of the crescent shaped cavity, although the drawings illustrate different cross-sections for purposes of description.

On the other hand, as soon as the line has reached its cast position with the weight striking the water, the lever 37 may be actuated to partially close the valve 35 and place a restriction in the passage 33. As a consequence, in the event a fish is hooked a certain degree of tension must be imposed on the line in order to cause the disc 22 to rotate and force fluid through the restricted opening of the valve member 35. By merely actuating the lever 37 in either direction a precise control of this tension may be effected.

As such time as the line 16 is to be wound in, it will be appreciated that the reel 10 will rotate in the opposite or clockwise direction as viewed in FIGURE 1, such that the fluid within the chamber 21 will be driven in the reverse direction from that indicated by the arrows in FIGURE 3. Thus, the fluid, assuming that the valve member 35 is partially closed to offer resistance to the passage 33, will bypass the valve 35 by flowing downwardly through the passage 32 and past the check valve 31, and thereafter through the passage 28, and passage 26, to the other side of the chamber 21. Thus, assuming that the valve 35 has been set after casting to create a certain tension on the line 16 in the event a fish hooks onto the line, no further adjustment need be made in order to freely wind the line in.

It is, therefore, evident that the improved hydraulic braking mechanism of the fishing reel of the present invention is semi-automatic in its operation, since once the line has been cast and the lever 37 properly positioned, no further manual controls need be employed until the fish is actually landed and the line is again cast outwardly. Of course, in the event the tension is to be varied in the line, in view of an unusually large fish or the like, a mere flick of the finger against the lever 37 will readily control the degree of poundage required.

In FIGURE 4, a modified construction is shown in which a ridged member 38 is adapted to receive a pumping disc 39. The ridged member 38 corresponds to the ridged member 19 of FIGURES 1-3, and the disc 39 corresponds to the disc 22 as shown in FIGURES 2 and 3. The disc 39 is provided with an inner shoulder 40 rotatably journalled in a bore 41 of ridged member 38. A reel shaft 42 may be integrally formed with the disc 39 and adapted for driving movement as the reel 10 is rotated. An oil seal 43 or the like may be provided to prevent fluid leakage.

With the latter construction the slotted portions 23a and 23b of FIGURES 2 and 3, for example, may be of equal thickness throughout the entire diameter of the disc instead of being centrally reduced in diameter, whereby vane means 44 will still extend the full width between outer disc 17 and the back closure of the ridged member 38. Thus, in FIGURE 2, bore 23 cannot extend throughout the thickness of disc 22 or the disc would be split in half. The construction of FIGURE 4 is preferred as it eliminates the necessity of imbedding the spring means within the pumping disc or bore 23 as is required with the construction of FIGURE 2 in order to employ an integral disc.

Although preferred embodiments have been shown and described, it will be appreciated that many changes and modifications may be made in the hydraulic braking mechanism of the present invention without departing from the spirit and scope thereof as set forth in the following claims.

What is claimed is:

1. In a reel: side plate means defining therein a disc-shaped chamber of given radius; a driving disc having a radius less than said given radius and eccentrically disposed within said chamber to define with said chamber a cresent shaped cavity for receiving a fluid, said driving disc being coaxially coupled for rotation with said reel; radially extending opposing vane members carried by said driving disc, said vane members being biased in opposite directions into sliding engagement with the sidewalls of said chamber; fluid passage means in said side plate means communicating from one end of said cavity to the other end of said cavity; a valve interposed in said fluid passage means to control fluid flow effected by said vane members between the opposite ends of said cavity; a manual control element coupled to said valve for regulating the restriction in said passage imposed by said valve; an auxiliary passage in said side plate means communicating from said cavity to said fluid passage means in parallel to said valve; and, check valve means in said auxiliary passage preventing flow therethrough in a direction from said fluid passage means to said chamber.

2. In a reel: side plate means defining therein a chamber for receiving a fluid, said side plate means further defining an inlet opening and an outlet opening to said chamber; fluid passage means in said side plate means connecting said inlet and outlet openings; fluid flow limiting means interposed in said fluid passage means for controlling fluid flow in said passage means; and, eccentrically mounted pumping means disposed within said chamber and rotatably coupled for actuation by said reel, said pumping means being designed for forcing fluid from said inlet opening to said outlet opening and, an auxiliary passage in said side plate means communicating from said chamber to said fluid passage means, said auxiliary passage bypassing said fluid flow limiting means; and, check valve means in said auxiliary passage preventing flow therethrough in a direction from said fluid passage means to said chamber.

References Cited in the file of this patent

UNITED STATES PATENTS

| | | |
|---|---|---|
| 721,827 | Okun | Mar. 3, 1903 |
| 1,754,223 | Crowell et al. | Apr. 15, 1930 |
| 2,238,786 | Warman | Apr. 15, 1941 |
| 2,358,825 | Pribula | Sept. 26, 1944 |
| 2,445,573 | Godbe | July 20, 1948 |
| 2,508,217 | Brell | May 16, 1950 |
| 2,530,286 | Catranis | Nov. 14, 1950 |
| 2,807,335 | Beaumont et al. | Sept. 24, 1957 |

FOREIGN PATENTS

| | | |
|---|---|---|
| 484,736 | Italy | Sept. 18, 1953 |